3,001,739
AERIAL CAPSULE EMERGENCY SEPARATION DEVICE
Maxime A. Faget and Andre J. Meyer, Jr., Newport News, Va., assignors to the United States of America as represented by the Administrator of National Aeronautics and Space Administration
Filed Oct. 16, 1959, Ser. No. 847,027
8 Claims. (Cl. 244—1)
(Granted under Title 35, U.S. Code (1952), sec. 266)

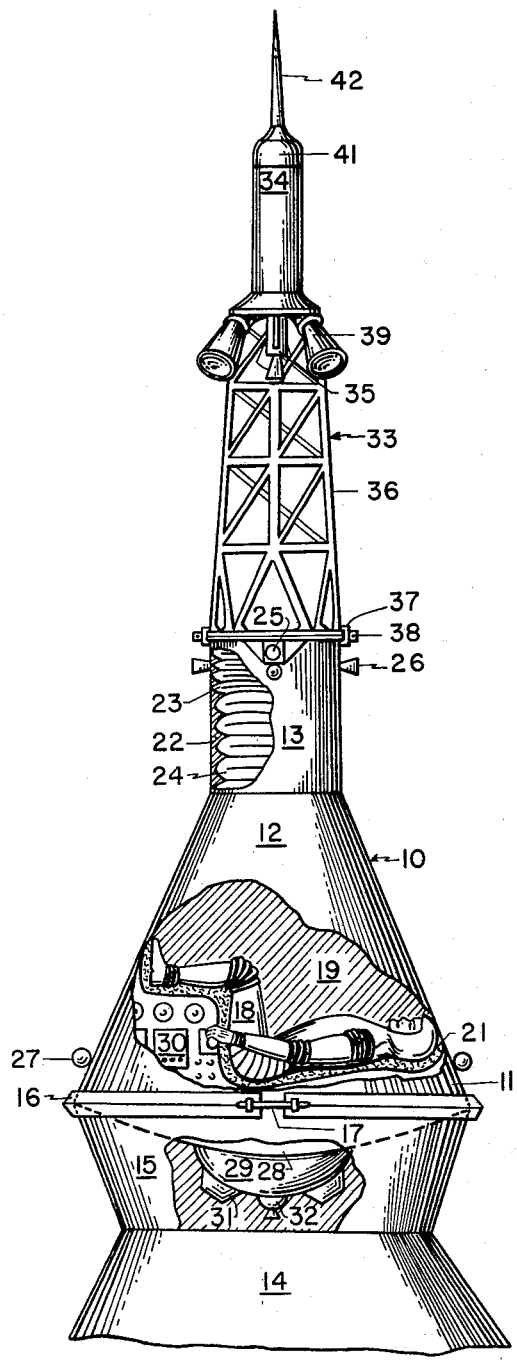

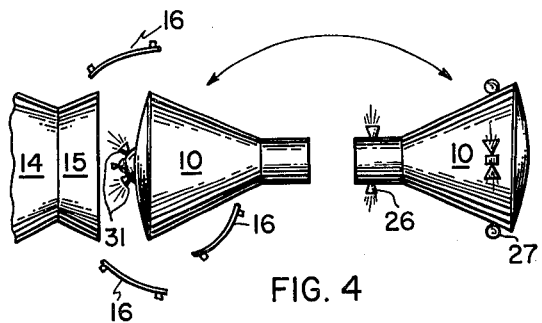
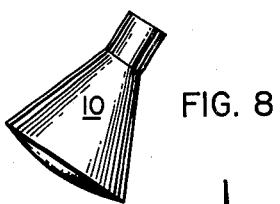
FIG. 4
FIG. 8
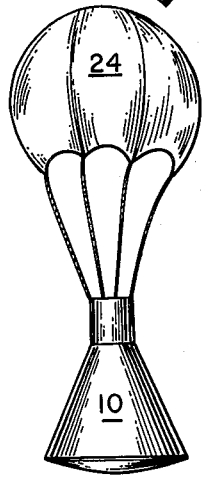
FIG. 5
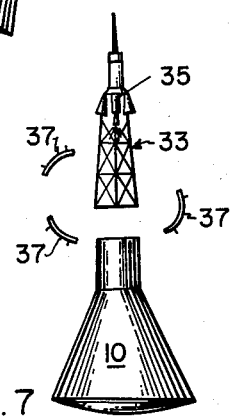
FIG. 7
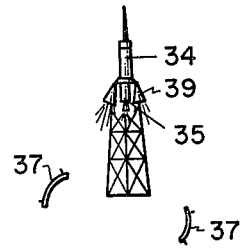
FIG. 3
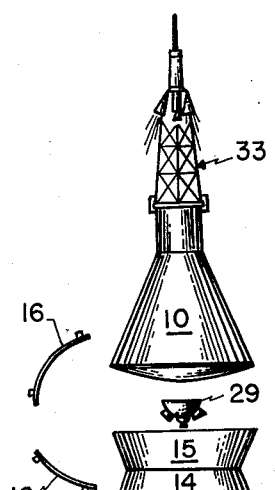
FIG. 6
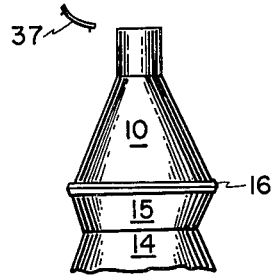
FIG. 2
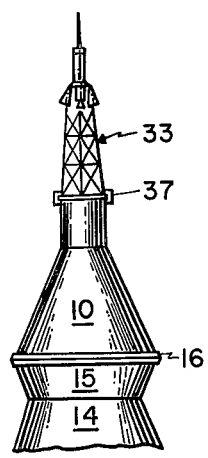
INVENTORS
MAXIME A. FAGET
ANDRE J. MEYER, JR.
BY
ATTORNEYS United States Patent Office 3,001,739
Patented Sept. 26, 1961

The invention described herein may be manufactured and used by or for the Government of the United States of America for governmental purposes without the payment of any royalties thereon or therefor.

This invention relates generally to aerial emergency escape means, and more particularly to an ejection configuration for detaching a space vehicle, such for example as a manned satellite capsule, from its launching vehicle in an emergency.

Present day scientific efforts to effect a manned orbital flight about the earth contemplates the substitution of a capsule for the payload of an available military missile and the utilization of the missile motors as a means for launching the capsule into orbit. In the event of a malfunctioning of the launching motors it is desirable to provide emergency means for the capsule which will allow for the escape of the occupant of the capsule from the proximate vicinity of the launching motors. Prior art escape devices, such for example as the ejection seats and encapsuled pods provided for conventional aircraft occupants lack the capability of ejecting an occupant safely clear of the danger area of the launching motors. Furthermore space limitations within the space capsule prevent the utilization of such escape devices.

Accordingly, it is a principal object of the present invention to provide a new and improved aerial emergency escape configuration.

Another object of the instant invention is the provision of means for separating a space vehicle from its launching vehicle.

A further object of this invention is to provide a new and improved aerodynamically stable and jettisonable device for lifting a nose package of a propellant motor clear of the motor upon malfunctioning thereof.

A still further object of the present invention is to provide a detachable emergecny lifting unit for a manned satellite capsule.

According to the present invention, the foregoing and other objects are attained by detachably mounting atop a space capsule a jettisonable tower supported propelling device for quickly raising the entire capsule away from its launching vehicle.

A more complete appreciation of the invention and many of the attendant advantages thereof will be readily appreciated as the same becomes better understood by reference to the following detailed description when considered in connection with the accompanying drawings wherein:

FIG. 1 is an enlarged elevational view, partly in section, of a manned satellite capsule launching configuration including the separation means in accordance with the present invention;

FIGS. 2–5 illustrate, to a greatly reduced scale, the sequence of events in a normal space capsule launching and recovery; and, FIGS. 6–8 illustrate, to a greatly reduced scale, the sequence of events in an aborted space capsule launching.

Referring now to the drawings wherein like reference numerals designate identical or corresponding parts throughout the several views, and more particularly to FIG. 1 whereon a space capsule 10 having a blunt forebody 11, a narrow afterbody 12 and a top cylindrical container 13 is shown as being positioned atop a launching vehicle, such for example as a rocket or missile motor, 14 by means of an adapter pedestal 15 secured to the nose portion of the launching vehicle. The capsule 10 is detachably seated upon the pedestal 15 by a circumscribing split ring 16 having one or more explosive bolts 17 connected between segments of the split clamp ring.

The astronaut, or occupant, 18 of the capsule 10 is placed within the lower compartment, or chamber, 19 formed by the forebody portion 11 of the capsule, and in order to sustain the high acceleration and landing impact forces to which the capsule will be subjected, the occupant is preferably supported by a contour couch 21 therein. A preferred type of contour couch is disclosed in the copending application of Maxime A. Faget, William B. Bland, and Jack C. Heberlig, Serial Number 840,983, filed September 18, 1959, of common assignee herewith. The upper compartment 22 formed by the container 13 of the capsule stores a drogue parachute 23 and a main parachute 24. The capsule 10 is also provided with an attitude control system consisting of an autopilot 25 which controls the operation of a plurality of minute rockets 26 spatially positioned along the periphery of the upper extremity of the cylindrical container 13 for regulating the pitch and yaw of the capsule, and another plurality of minute rockets 27 positioned along the periphery of the lower extremity of the capsule forebody 11 for regulating the roll of the capsule. Detachably attached to the thick underside 28 of the capsule forebody is a container 29 within which is housed a number of posigrade rockets 31 and retrorockets 32. If desired, control and communication instruments 30 may also be disposed within the compartment 19. It will be readily appreciated by those skilled in the art to which the present invention relates that the operation of the explosive bolts 17, parachutes 23 and 24, rockets 26, 27, 31 and 32 can be controlled remotely from a ground station, or by means manually operated by the occupant 18, or by conventional sequence programming devices among the instruments 30.

It is to be understood that inasmuch as the space capsule 10 does not constitute part of the instant invention, only so much of the structural details and operational features thereof considered to be essential for a complete understanding of this invention are described herein. A complete description of the manned space capsule 11 is disclosed in the copending application of Maxime A. Faget et al., Serial Number 847,023, filed October 16, 1959, and of common assignee herewith.

Mounted atop the capsule container 13 is the emergency separation unit 33 of the present invention. As shown in FIG. 1, the unit consists of separate rocket motors 34 and 35 supported by a tower 36. The base of the tower 36 is detachably secured to the capsule container 13 by a clamp ring 37 having one or more explosive bolts 38 normally maintaining the segments thereof in a continuous ring. The rocket motor 34 is of a size suitable to rapidly lift the capsule 10 a predetermined safe separation distance from the launching motor 14 in the event of an impending failure thereof. A preferred rocket motor design would provide for a separtion distance of approximately 250 feet during the first second of rocket motor operation. The rocket motor 34 is provided with three nozzles 39 which nozzles are equidistantly spaced and suitably canted so as to direct the rocket blast outward and away from the tower 36 and capsule 10. The rocket motor 35 is positioned under rocket motor 34 and is of a suitable size to effect jettisoning of the separation unit 33, as will be more fully explained hereinafter. A ballast 41 is positioned on the rocket motor 34 for maintaining the capsule statically stable and trim in the same attitude as the capsule would maintain during a normal launching. An aerodynamic spike 42 may be vertically disposed atop the ballast 41 for developing a shock wave which will reduce the heating of the capsule by aerodynamic friction during the launching flight period.

For the purpose of providing a better understanding of the capsule separation unit, the operational sequence of both a normal and aborted space capsule flight will now be described in relation to FIGS. 2–5 and FIGS. 6–8, respectively.

Upon initiation of the launching motor 14, the capsule 10 is carried aloft, as shown in FIG. 2, until at a suitable altitude or time thereafter, the explosive bolts 38 are ignited whereupon the tower clamp ring 37 is released. Concurrently therewith both the escape rockets 34 and jettison rocket 35 are fired thereby raising the entire separation unit 33 away from the capsule 10, as shown in FIG. 3. At a suitable time thereafter, such for example as when the conditions of velocity and altitude satisfactory for orbital injection of the capsule are attained, the explosive bolts 17 are ignited and clamp ring 16 released. Concurrently therewith the posigrade rockets 31 are fired and the capsule 10 is separated from the pedestal 15 of the launching motor 14. Immediately after separation, the autopilot 25 will change the attitude of the capsule 180 degrees, as shown in FIG. 4 of the drawing. While the capsule is in orbit, the autopilot 25 will regulate the operation of jets 26 and 27 in a manner to stabilize the attitude of the capsule in space. At the proper time for reentry into the earth's atmosphere, the retrorockets 32 will be fired to bring the capsule out of orbit. The container 29 is then detached from the capsule underbody. After reentry, atmospheric drag will reduce the speed of the capsule until it approaches sonic level, at which time the drogue parachute 23 is deployed to stabilize the capsule attitude during this period of descent. When the velocity of the capsule has been further reduced, the landing parachute 24 is deployed, and the drogue parachute 23 released, as shown in FIG. 5, thereby to slowly lower the capsule to the earth's surface for recovery. It will be apparent from the foregoing description of a normal space capsule flight that the emergency separation system according to the present invention is fully compatible with a normal space flight operation.

In the event of an impending malfunctioning of the launching vehicle 14, either on the ground or in early stage of flight, the explosive bolts 17 are ignited and the adapter clamp ring 16 released. Concurrently therewith, the rocket package 29 is detached and the escape rocket motor 34 fired thereby to rapidly propel the manned capsule upwards from the immediate vicinity of the launching motor 14, as shown in FIG. 6. When the capsule has been raised to a maximum escape altitude, the explosive bolts 38 are ignited and the tower clamp ring 37 released. The jettison rocket 35 is then fired and the emergency escape unit 33 separated from the capsule 10, as shown in FIG. 7. The capsule reorients itself as shown in FIG. 8 and will then go through the normal sequency of reentry, drogue parachute deployment, main parachute deployment, landing and recovery.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination with an aerial vehicle, an emergency unit comprising first propellant motor means for rapidly lifting the aerial vehicle a predetermined distance, second propellant motor means for effecting spatial separation between the emergency unit and the aerial vehicle, means for supporting said first and second motor means above the aerial vehicle, and means for normally attaching said last recited means to the aerial vehicle and for selectively detaching said last recited means therefrom.

2. In combination with an aerial vehicle, an emergency unit comprising a tower vertically positioned upon the aerial vehicle, a first rocket motor supported by said tower, a plurality of nozzles for said first motor, said nozzles being equidistantly spaced and inclined in an outwardly direction, a second rocket motor having a centrally disposed nozzle supported by said tower beneath said first motor, a ballast supported by said tower above said first motor, and explosive responsive means for normally securing said tower to the aerial vehicle and for selectively effecting detachment therefrom.

3. In an emergency unit according to claim 2, an aerodynamic spike positioned atop said ballast.

4. In combination with an aerial capsule, an emergency unit comprising a tower vertically positioned atop the aerial capsule, a first rocket motor supported atop said tower, said first motor having thrust generating capabilities suitable to rapidly lift the aerial capsule a predetermined spatial distance, a plurality of nozzles coupled to the lower extremity of said first rocket, said nozzles being equidistantly spaced and inclined outwardly at an angle with said tower sufficient to direct the blast from said first rocket motor aside of the aerial capsule, a ballast superposed on said first motor, explosive actuated means for normally attaching said tower to the aerial capsule and for selectively detaching said tower therefrom, and a second rocket motor having a single centrally disposed nozzle supported by said tower subjacent said first motor, said second motor being of a magnitude suitable to lift said tower from the aerial capsule subsequent to the detachment thereof.

5. In an emergency unit according to claim 4, an aerodynamic spike supported by said tower atop said ballast.

6. In an emergency unit according to claim 4 wherein said explosive actuated means includes a segmented clamp ring contiguously encircling the base of said tower and the upper extremity of the aerial capsule, and an explosive bolt interconnecting segments of said clamp ring.

7. In combination with an aerial vehicle, an emergency propulsion system comprising a tower, means detachably connecting a first end of said tower to said aerial vehicle, a rocket motor, means connecting said rocket motor to a second end of said tower in a position so as to exhaust in the general direction of said aerial vehicle, and a plurality of exhaust nozzles connected to said rocket motor at equidistant portions thereof to direct the exhaust of said rocket motor away from said aerial vehicle.

8. The combination set forth in claim 7 comprising a second rocket motor mounted on said tower, said second rocket motor developing less thrust than said first rocket motor, but having sufficient thrust generating capabilities to lift said tower and said first rocket motor.

References Cited in the file of this patent
UNITED STATES PATENTS 2,649,266    Darrieus    Aug. 18, 1953
2,809,584    Smith    Oct. 15, 1957

OTHER REFERENCES

1-Ton Space Capsules Chuted to Ocean, Recovered Intact—The Evening Star, Washington, D.C., March 26, 1959, pg. A5.